UNITED STATES PATENT OFFICE 2,587,660

TRIFLUOROMETHYL PHENOTHIAZINE

Nathan L. Smith, Indian Head, Md.

No Drawing. Application October 30, 1950,
Serial No. 193,013

3 Claims. (Cl. 260—243)

(Granted under the act of March 3, 1883, as
amended April 30, 1928; 370 O. G. 757)

This invention relates to new phenothiazine derivatives, more particularly to phenothiazines containing a trifluoromethyl group.

The new compounds of the invention have the general formula:

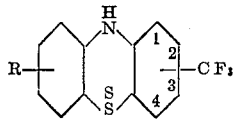

wherein R is hydrogen or an alkyl group, e. g., methyl, ethyl, propyl, butyl, etc.

The new compounds are low temperature antioxidants for substances such as gasoline and petroleum lubricants. The presence of the trifluoromethyl group renders the phenothiazine molecule more stable and tends to increase its activity as an antioxidant. The presence of the alkyl group increases the solubility of the phenothiazine molecule in liquid hydrocarbons.

The preparation of the new phenothiazines can be undertaken by the known method of fusing the corresponding diphenylamine with sulfur in the presence of a trace of iodine. The starting diphenylamines are new compounds described and claimed in my copending application, Serial No. 193,015, filed October 30, 1950, now U. S. Patent 2,572,067, granted October 23, 1951, and are prepared by the condensation of the corresponding trifluromethylacetanilide with bromobenzene or the corresponding mono-brominated alkyl benzene, e. g., m-bromotoluene, in the presence of a liquid organic diluent, e. g., nitrobenzene, a copper condensing agent, such as cuprous bromide and an acid binding agent, e. g., potassium carbonate.

The invention is further illustrated by the following specific examples of the preparation of the new phenothiazine derivatives to which, however, the invention is not intended to be limited. Parts are by weight.

Example 1

To 7 parts (.03 mol) 3-trifluoromethyldiphenylamine was added 2.3 parts sublimed sulfur and 0.2 part iodine. The mixture was heated at 140–150° C. for 1 hour and cooled. The cooled reaction product was dissolved in an organic solvent (toluene) stirred with filter-cel and charcoal, filtered, and the solution allowed to crystallize. The crude 2-trifluoromethyl phenothiazine was recrystallized from alcohol as yellow platelets, M. P. 188–189° C. The compound dissolves in concentrated sulfuric acid with a brown color which remains unchanged on dilution with water or the addition of nitric acid.

Example 2

2 parts 3-trifluoromethyl-3'-methyldiphenylamine, 0.5 part sulfur and a small crystal of iodine were heated for 1 hour in an oil bath maintained at 140–150° C. The reaction product was cooled, dissolved in benzene, decolorized by stirring with filter-cel and charcoal, filtered, and allowed to crystallize. Recrystallized from benzene, the 2-trifluoromethyl - 8 - methyl phenothiazine appeared as yellow platelets having a melting point of 227–228° C.

The invention described herein may be manufactured and used by or for the Government of the United States of America for governmental purposes without the payment of any royalties thereon or therefor.

What is claimed is:

1. A trifluoromethyl phenothiazine of the general formula:

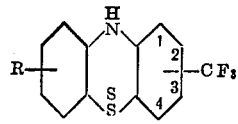

wherein R is a radical selected from the group consisting of hydrogen and alkyl radicals.

2. As a new compound, 2-trifluoromethyl phenothiazine.

3. As a new compound, 2-trifluoromethyl-8-methylphenothiazine.

NATHAN L. SMITH.

REFERENCES CITED

The following references are of record in the file of this patent:

UNITED STATES PATENTS

| Number | Name | Date |
|---|---|---|
| 2,085,736 | Calcott et al. | July 6, 1937 |